United States Patent
Yamamoto

(10) Patent No.: US 7,415,258 B2
(45) Date of Patent: Aug. 19, 2008

(54) TELEVISION TUNER CAPABLE OF REDUCING GAIN DEVIATION WHEN LOW-BAND OR HIGH-BAND SIGNAL IS RECEIVED

(75) Inventor: Masaki Yamamoto, Tokyo (JP)

(73) Assignee: Alps Electric Co., Ltd, Tokyo (JP)

( * ) Notice: Subject to any disclaimer, the term of this patent is extended or adjusted under 35 U.S.C. 154(b) by 471 days.

(21) Appl. No.: 11/152,654

(22) Filed: Jun. 14, 2005

(65) Prior Publication Data

US 2005/0285978 A1 Dec. 29, 2005

(30) Foreign Application Priority Data

Jun. 24, 2004 (JP) .............................. 2004-003688

(51) Int. Cl.
*H04B 1/18* (2006.01)
(52) U.S. Cl. .............. 455/180.1; 455/180.2; 455/188.1; 455/188.2; 348/731
(58) Field of Classification Search ............. 455/179.1, 455/180.1, 180.2, 187.1, 188–191.3; 348/729, 348/731–733
See application file for complete search history.

(56) References Cited

U.S. PATENT DOCUMENTS

| 3,727,140 | A | * | 4/1973 | Nieto et al. | ............... | 455/189.1 |
| 3,794,924 | A | * | 2/1974 | Furuya et al. | ............ | 455/191.2 |
| 4,189,678 | A | * | 2/1980 | Sakamoto et al. | ........ | 455/180.4 |
| 4,461,038 | A | * | 7/1984 | Miyoshi | ................... | 455/176.1 |
| 4,656,364 | A | * | 4/1987 | Yokogawa et al. | .......... | 307/112 |
| 4,726,072 | A | * | 2/1988 | Yamashita et al. | ....... | 455/189.1 |
| 4,771,332 | A | * | 9/1988 | Metoki | ....................... | 348/731 |
| 4,972,509 | A | * | 11/1990 | Maejima | .................. | 455/180.1 |
| 6,791,626 | B2 | * | 9/2004 | Yamamoto et al. | .......... | 348/729 |
| 6,864,925 | B2 | * | 3/2005 | Yamamoto | ................... | 348/731 |
| 7,030,937 | B2 | * | 4/2006 | Yamamoto | ................... | 348/729 |
| 7,289,780 | B2 | * | 10/2007 | Yamamoto | ............... | 455/180.4 |
| 2002/0057381 | A1 | * | 5/2002 | Yamamoto et al. | .......... | 348/731 |
| 2002/0063804 | A1 | * | 5/2002 | Yamamoto | ................... | 348/725 |
| 2002/0075414 | A1 | * | 6/2002 | Yamamoto | ................... | 348/731 |
| 2002/0186326 | A1 | * | 12/2002 | Yamamoto | ................... | 348/731 |
| 2002/0191118 | A1 | * | 12/2002 | Yamamoto | ................... | 348/731 |

(Continued)

FOREIGN PATENT DOCUMENTS

JP 11-275478 10/1999

*Primary Examiner*—Edward Urban
*Assistant Examiner*—RuiMeng Hu
(74) *Attorney, Agent, or Firm*—Brinks Hofer Gilson & Lione

(57) ABSTRACT

A television tuner includes: low band and high-band receiving units; a mixer that frequency-converts low-band television signals from the low-band receiving unit or high-band television signals from the high-band receiving unit; first and second switching diodes that couple the low-band or high-band receiving unit and the mixer to each other, respectively; and a transistor which applies a bias voltage to one end of each of the switching diodes. The emitter of the transistor is grounded and the collector is pulled up to a power supply through a resistor. ON/OFF of the switching diodes are switched to be opposite to each other. The other end of each of the switching diodes is connected to the collector through a first inductance element. The collector of the transistor is connected to one end of a second inductance element, and the other end of the second inductance element is grounded in a high-frequency manner.

3 Claims, 2 Drawing Sheets

U.S. PATENT DOCUMENTS

2003/0076449 A1* 4/2003 Yamamoto ................. 348/731
2003/0133048 A1* 7/2003 Morisada ................... 348/731
2003/0193620 A1* 10/2003 Yamamoto ................. 348/731
2003/0202125 A1* 10/2003 Yamamoto ................. 348/731

* cited by examiner

TELEVISION TUNER CAPABLE OF REDUCING GAIN DEVIATION WHEN LOW-BAND OR HIGH-BAND SIGNAL IS RECEIVED

This application claims the benefit of priority to Japanese Patent Application No. 2004-003688, filed on Jun. 24, 2004, herein incorporated by reference.

BACKGROUND OF THE INVENTION

1. Field of the Invention

The present invention relates to a television tuner.

2. Description of the Related Art

A conventional television tuner will be described with reference to FIG. 2. In FIG. 2, an interstage double-tuned circuit 53 (hereinafter, referred to as a double-tuned circuit) is provided between a high-frequency amplifier 51 and a mixer 52. A primary tuning circuit 53a includes a high-band tuning coil 54 and a low-band tuning coil 55 connected in series at one end of each coil, and a varactor diode 56 connected in parallel to the high-band tuning coil 54 and the low-band tuning coil 55 connected in series. An anode of the varactor diode 56 is grounded, and a cathode thereof is connected to the other end of the high-band tuning coil 54 through a DC-blocking capacitor 57 interposed therebetween.

In a similar manner, a secondary tuning circuit 53b includes a high-band tuning coil 58 and a low-band tuning coil 59 connected in series at one end of each coil, and a varactor diode 60 connected in parallel to the high-band tuning coil 58 and the low-band tuning coil 59 connected in series. An anode of the varactor diode 60 is grounded, and a cathode thereof is connected to the other end of the high-band tuning coil 58 through a DC-blocking capacitor 61 interposed therebetween.

Further, the other ends of the low-band tuning coils 55 and 59 are connected to one end of a coupling coil 62, and the other end of the coupling coil 62 is grounded through a DC-blocking capacitor 63.

Furthermore, a connection point of the high-band tuning coil 54 and the low-band tuning coil 55 in the primary tuning circuit 53a is connected to a cathode of a switching diode 64, and an anode thereof is grounded through a DC-blocking capacitor 65. Similarly, a connection point of the high-band tuning coil 58 and the low-band tuning coil 59 in the secondary tuning circuit 53b is connected to a cathode of a switching diode 66, and an anode thereof is grounded through a DC-blocking capacitor 67.

In addition, the anode of the switching diode 64 is connected to a high-band switching terminal 69 through a resistor 68, and similarly, the anode of the switching diode 66 is connected to the high-band switching terminal 69 through a resistor 70.

Moreover, a connection point of a coupling capacitor 62 and the DC-blocking capacitor 63 is connected to a low-band switching terminal 72 through a resistor 71. Also, a tuning voltage is applied to the cathode of the varactor diode 56 from a tuning voltage terminal 73 through a resistor 74, and similarly, the tuning voltage is applied to the cathode of the varactor diode 60 from the tuning voltage terminal 73 through a resistor 75.

A peaking circuit 76 is provided between the double-tuned circuit 53 and the mixer 52. The peaking circuit 76 is DC-blocked from the double-tuned circuit 53 by a DC-blocking capacitor 77 and also DC-blocked from the mixer 52 by a DC-blocking capacitor 78.

The peaking circuit 76 is composed of a peaking coil 79, a switching diode 80 and a DC-blocking capacitor 81 connected to each other in series. The peaking coil 79 is connected to the DC-blocking capacitors 77 and 78, and one end of the DC-blocking capacitor 81 is grounded. Also, a cathode of the switching diode 80 is connected to the low-band switching terminal 72 through a resistor 82, and an anode thereof is connected to the high-band switching terminal 69 through a resistor 83. The inductance of the peaking coil 79 and an input capacitance 84 of the mixer 52 are set to cooperate to resonate with the frequency of a lower-band television signal within the range of high-band television signals.

In the above-mentioned configuration, when high-band television signals included in a VHF band are received, a current passes through both of the switching diodes 64 and 66 by a switching voltage applied to the high-band switching terminal 69, so that the double-tuned circuit 53 is in a state in which the high-band television signals are received. The switching voltage applied to the high-band switching terminal 69 is also applied to the anode of the switching diode 80, so that the switching diode 80 is also in an electrical connection state. As a result, a parallel resonating circuit is constructed by the peaking coil 79 and the input capacitance 84 of the mixer 52.

Further, by the parallel resonating circuit constructed by the peaking coil 79 and the input capacitance 84 of the mixer 52, the gain of a lower-band television signal within the range of the high-band television signals is increased.

In addition, by the tuning voltage applied to the tuning voltage terminal 73, the double-tuned circuit 53 is tuned to a desired frequency (for example, see Japanese Unexamined Patent Application Publication No. 11-275478 (FIG. 2)).

However, the television tuner has a complicated configuration because the interstage tuning circuit is a band switching type. Also, since the peaking circuit can not be constructed when low-band television signals are received, there is a problem in that a gain deviation in the low band cannot be solved.

SUMMARY OF THE INVENTION

The present invention is designed to solve the above problems, and it is an object of the invention to construct a peaking circuit in any case in which low-band television signals or high-band television signals are received to thereby eliminate a gain deviation in each of the bands.

In order to achieve the above object, according to an aspect of the invention, a television tuner includes: a low-band receiving unit; a high-band receiving unit; a mixer that frequency-converts low-band television signals output from the low-band receiving unit or high-band television signals output from the high-band receiving unit; a first switching diode that couples the low-band receiving unit and the mixer to each other; a second switching diode that couples the high-band receiving unit and the mixer to each other; and a first transistor which applies a bias voltage to one end of each of the first and second switching diodes, in which an emitter is grounded and a collector is pulled up to a power supply through a resistor, and which switches ON/OFF of the first and second switching diodes so as to be opposite to each other. The other end of each of the first and second switching diodes is connected to a collector of the first transistor through a first inductance element interposed therebetween. The collector of the first transistor is connected to one end of a second inductance element, and the other end of the second inductance element is grounded in a high-frequency manner.

Further, in the television tuner according to the invention, it is preferable that the low-band receiving unit be provided with a low-band amplifier for amplifying the low-band television signals, that the high-band receiving unit be provided with a high-band amplifier for amplifying the high-band television signals, and that operations of the low-band amplifier and the high-band amplifier be switched by the first transistor, respectively.

Furthermore, in the television tuner according to the invention, it is preferable that a second transistor in which an emitter is grounded and a collector is pulled up to the power supply through a first resistor be provided, and that a second resistor be connected between a base of the second transistor and an input terminal of the low-band amplifier. In addition, it is preferable that a collector of the second transistor be connected to an input terminal of the high-band amplifier, that the input terminal of the high-band amplifier be grounded through a third resistor, and that the other end of the second inductance element be connected to the input terminal of the low-band amplifier through a fourth resistor interposed therebetween.

DESCRIPTION OF THE PREFERRED EMBODIMENT

Figure 1:
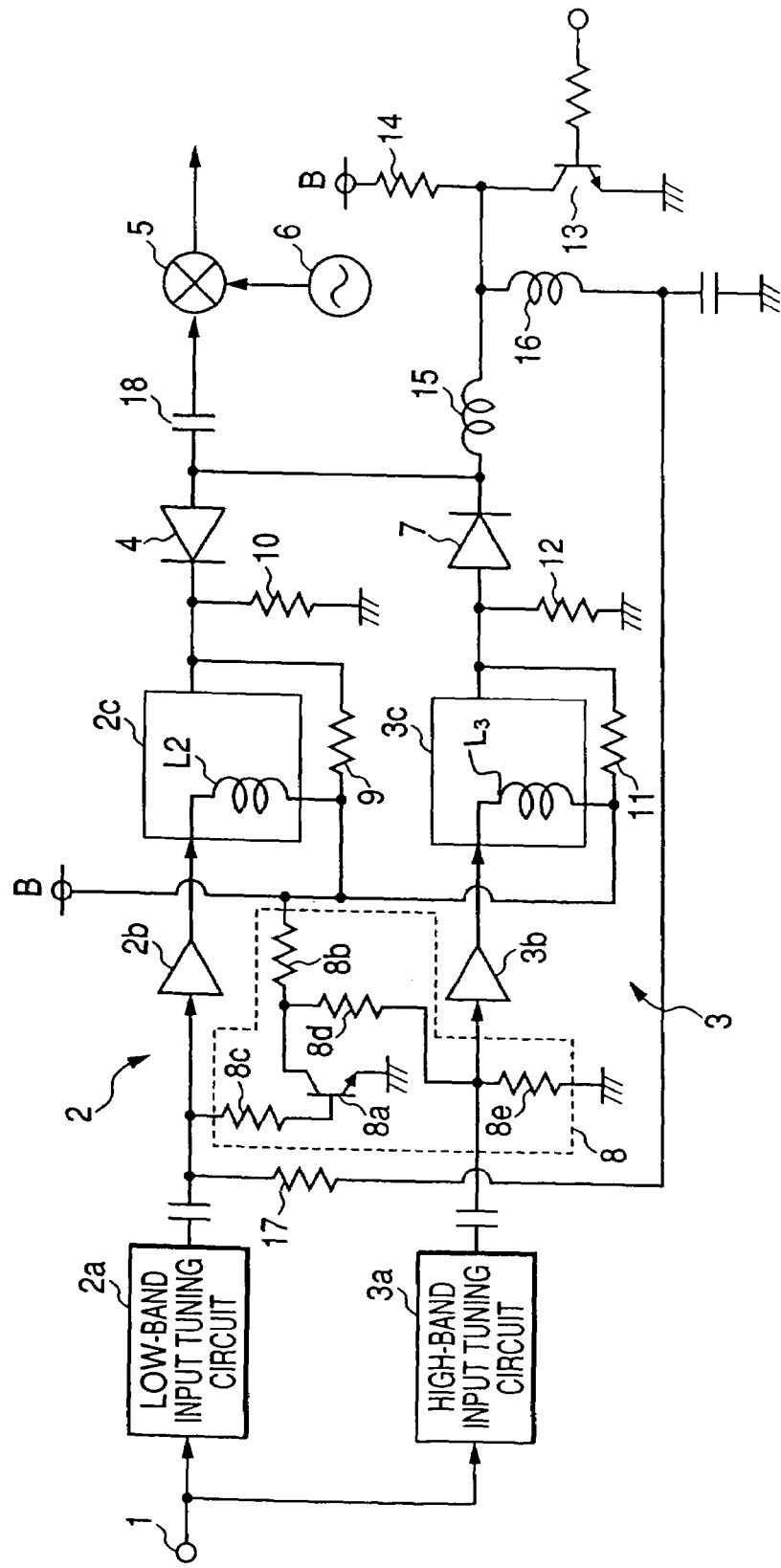
FIG. 1 is a circuit diagram showing the configuration of a television tuner according to the invention.
Figure 2:
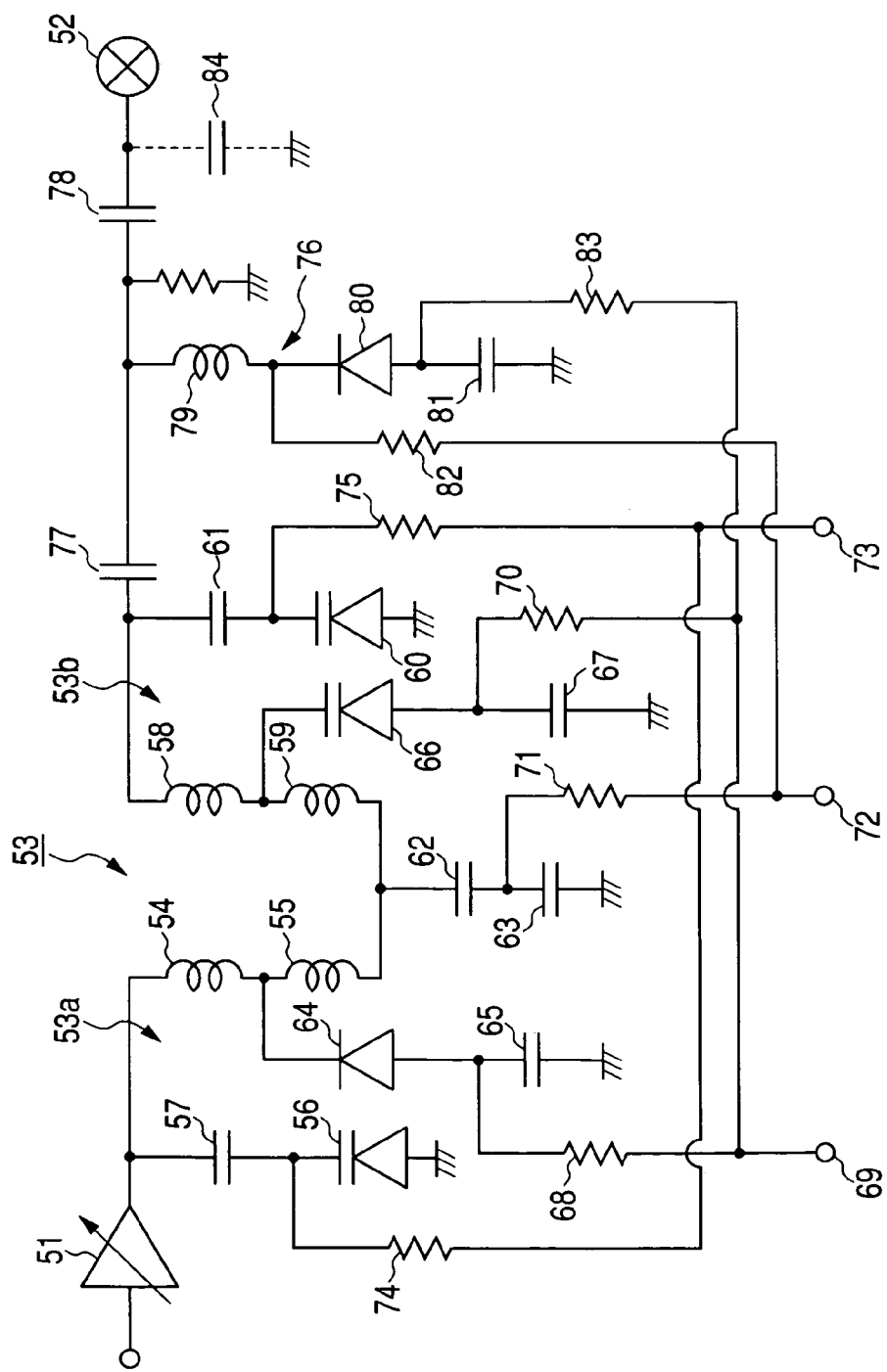
FIG. 2 is a circuit diagram showing the configuration of a conventional television tuner.

Hereinafter, a television tuner of the present invention will be described with reference to FIG. 1. A low-band receiving unit 2 and a high-band receiving unit 3 are connected to an input terminal 1. The low-band receiving unit 2 includes a low-band input tuning circuit 2a connected to the input terminal 1, a low-band amplifier 2b provided at an output side of the low-band input tuning circuit 2a, and a low-band interstage tuning circuit 2c provided at an output side of the low-band amplifier 2b, as shown in FIG. 1. In addition, the low-band receiving unit 2 is coupled to a mixer 5 through a first switching diode 4 interposed therebetween. The mixer 5 is supplied with a local oscillation signal from an oscillator 6.

Each of the low-band input tuning circuit 2a and the low-band interstage tuning circuit 2c is constructed by a single tuning circuit, and includes a varactor diode (not shown) to tune a television signal of a predetermined low-band channel in a VHF band. The television signal of the low-band channel selected/amplified by the low-band receiving unit 2 is frequency-converted into an intermediate frequency signal by the mixer 5.

In a similar manner, the high-band receiving unit 3 includes a high-band input tuning circuit 3a connected to the input terminal 1, a high-band amplifier 3b provided at an output side of the high-band input tuning circuit 3a, and a high-band interstage tuning circuit 3c provided at an output side of the high-band amplifier 3b, as shown in FIG. 1. In addition, the high-band receiving unit 3 is coupled to a mixer 5 through a second switching diode 7 interposed therebetween.

In addition, each of the high-band input tuning circuit 3a and the high-band interstage tuning circuit 3c is constructed by a single tuning circuit, and includes a varactor diode (not shown) to tune a television signal of a predetermined high-band channel in a VHF band. The television signal of the high-band channel selected/amplified by the high-band receiving unit 3 is frequency-converted into an intermediated frequency signal by the mixer 5.

The low-band amplifier 2b and the high-band amplifier 3b are formed in the same integrated circuit (not shown). The integrated circuit is also provided with a bias switching circuit 8 for switching a bias voltage applied to the low-band amplifier 2b and the high-band amplifier 3b. The bias switching circuit 8 has a second transistor 8a and resistors arranged around the second transistor 8a. Specifically, an emitter of the second transistor 8a is grounded, a collector thereof is pulled up to a power supply voltage B through a first resistor 8b, and a base thereof is connected to an input terminal of the low-band amplifier 2b through a second resistor 8c interposed therebetween. Further, an input terminal of the high-band amplifier 3b is directly connected to a collector of the second transistor 8a or connected thereto through a fifth resistor 8d interposed therebetween, and is grounded through a third resistor 8e.

An output terminal of the low-band amplifier 2b is supplied with the power supply voltage B through a coil L2 of the low-band interstage tuning circuit 2c. Similarly, an output terminal of the high-band amplifier 3b is supplied with the power supply voltage B through a coil L3 of the high-band interstage tuning circuit 3c.

Further, each of the input terminals of the low-band amplifier 2b and the high-band amplifier 3b is connected to an input terminal of an internal amplifying element, and each of the output terminals thereof is connected to an output terminal of the amplifying element. Therefore, when the bias voltage is supplied to the input terminal of the amplifying element, each of the amplifiers 2b and 3b is in an operating state.

A bias voltage obtained by dividing the power supply voltage B by resistors 9 and 10 is applied to a cathode (one end) of the first switching diode 4, and a bias voltage obtained by dividing the power supply voltage B by resistors 11 and 12 is applied to an anode (one end) of the second switching diode 7. An anode (the other end) of the first switching diode 4 and a cathode (the other end) of the second switching diode 7 are connected to each other to be coupled to the mixer 5 through a coupling capacitor 18 interposed therebetween.

The first and second switching diodes 4 and 7 are ON/OFF controlled by a first transistor 13. An emitter of the first transistor 13 is grounded, and a collector thereof is pulled up to the power supply voltage B through a resistor 14. In addition, a collector thereof is connected to a connection point between the anode of the first switching diode 4 and the cathode of the second switching diode 7 through a first inductance element 15 interposed therebetween. Also, the collector is connected to one end of a second inductance element 16. The other end of the second inductance element 16 is grounded through a DC-blocking capacitor in a high-frequency manner, and is connected to the input terminal of the low-band amplifier 2b through a fourth resistor 17 interposed therebetween. A switching voltage is applied to a base of the first transistor 13.

In the above-mentioned configuration, when low-band television signals are received, the first transistor 13 is turned off. Thereby, the first switching diode 4 is turned on, and the second switching diode 7 is turned off. Since it is possible to flow a sufficient current through the first switching diode 4, a resistance component can be made small. Further, the bias voltage is applied to the input terminal of the low-band amplifier 2b by the second resistor 8c and the fourth resistor 17 to thereby turn on the second transistor 8a. Accordingly, no bias voltage is applied to the input terminal of the high-band amplifier 3b. As a result, the low-band television signals are input from the low-band receiving unit 2 to the mixer 5.

At that time, the anode of the first switching diode 4 and the cathode of the second switching diode 7 are shunted by a series circuit composed of the first and second inductance elements 15 and 16. Since the series circuit and an input capacitance component of the mixer 5 constitute a parallel resonating peaking circuit, it is possible to reduce a gain deviation by setting the inductance of each of the inductance elements 15 and 16 such that a resonating frequency becomes a predetermined frequency (for example, a frequency of a band in which a gain is reduced) in a low band.

Further, since the series circuit, composed of the first and the second inductance elements 15 and 16, and the coupling capacitor 18 constitute a low pass filter, an image signal input from the low-band receiving unit 2 is suppressed, and the leakage of a local oscillation signal into the low-band receiving unit 2 is also suppressed.

On the other hand, when high-band television signals are received, the first transistor 13 is turned on. Thereby, the first switching diode 4 is turned off, and the second switching diode 7 is turned on. Since it is possible to flow a sufficient current through the second switching diode 7, a resistance component can be made small. Further, no bias voltage is applied to the input terminal of the low-band amplifier 2b to thereby turn on the second transistor 8a. Accordingly, the bias voltage is applied to the input terminal of the high-band amplifier 3b by the first resistor 8b and the third resistor 8e. As a result, the high-band television signals are input from the high-band receiving unit 3 to the mixer 5.

At that time, the anode of the first switching diode 4 and the cathode of the second switching diode 7 are shunted only by the first inductance element 15. Since the first inductance element 15 and the input capacitance component of the mixer 5 constitute a parallel resonating peaking circuit, it is possible to reduce a gain deviation by setting the inductance of the inductance element 15 such that the resonating frequency becomes a predetermined frequency (for example, a frequency of a band in which a gain is reduced) in a high band.

Further, since the first inductance element 15 and the coupling capacitor 18 constitute a low pass filter, it is possible to suppress an image signal and a local oscillation signal.

As described above, according to the invention, a television tuner includes: a low-band receiving unit; a high-band receiving unit; a mixer that frequency-converts low-band television signals output from the low-band receiving unit or high-band television signals output from the high-band receiving unit; a first switching diode that couples the low-band receiving unit and the mixer to each other; a second switching diode that couples the high-band receiving unit and the mixer to each other; and a first transistor which applies a bias voltage to one end of each of the first and second switching diodes, in which an emitter is grounded and a collector is pulled up to a power supply through a resistor, and which switches ON/OFF of the first and second switching diodes so as to be opposite to each other. In addition, the other end of each of the first and second switching diodes is connected to a collector of the first transistor through a first inductance element interposed therebetween. The collector of the first transistor is connected to one end of a second inductance element, and the other end of the second inductance element is grounded in a high-frequency manner. Accordingly, when low-band television signals are received with the first transistor off, the anode of the first switching diode and the cathode of the second switching diode are shunted by a series circuit composed of the first and second inductance elements. Since the series circuit and the input capacitance component of the mixer constitute a parallel resonating peaking circuit, a gain deviation can be reduced in the low band. Meanwhile, when high-band television signals are received with the first transistor on, the anode of the first switching diode and the cathode of the second switching diode are shunted only by the first inductance element. Since the first inductance element and the input capacitance component of the mixer constitute a parallel resonating peaking circuit, a gain deviation can be also reduced in the high band.

Further, according to the television tuner of the invention, the low-band receiving unit is provided with a low-band amplifier for amplifying the low-band television signals. The high-band receiving unit is provided with a high-band amplifier for amplifying a high-band television signal. Operations of the low-band amplifier and the high-band amplifier are switched by the first transistor, respectively. Accordingly, it is possible to switch the first and second switching diodes at the same time.

Furthermore, according to the television tuner of the invention, a second transistor in which an emitter is grounded and a collector is pulled up to the power supply through a first resistor is provided, and a second resistor is connected between a base of the second transistor and an input terminal of the low-band amplifier. In addition, a collector of the second transistor is connected to an input terminal of the high-band amplifier. The input terminal of the high-band amplifier is grounded through a third resistor, and the other end of the second inductance element is connected to the input terminal of the low-band amplifier through a fourth resistor interposed therebetween. Accordingly, ON/OFF of the second transistor can be controlled by the first transistor, and the low-band amplifier and the high-band amplifier can be respectively switched between an operation mode and a non-operation mode by switching the bias voltages thereof.

The invention claimed is:

1. A television tuner comprising:
   a low-band receiving unit;
   a high-band receiving unit;
   a mixer that frequency-converts low-band television signals output from the low-band receiving unit or high-band television signals output from the high-band receiving unit;
   a first switching diode that couples the low-band receiving unit and the mixer to each other;
   a second switching diode that couples the high-band receiving unit and the mixer to each other; and
   a first transistor which applies a bias voltage to one end of each of the first and second switching diodes, in which an emitter is grounded and a collector is pulled up to a power supply through a resistor, and which switches ON/OFF of the first and second switching diodes so as to be opposite to each other,
   wherein the other end of each of the first and second switching diodes is connected to a collector of the first transistor through a first inductance element interposed therebetween, and
   the collector of the first transistor is connected to one end of a second inductance element, and the other end of the second inductance element is grounded in a high-frequency manner,
   wherein the first transistor is turned off and a series circuit composed of the first and second inductance elements is grounded in a high-frequency manner when the low-band television signals are received and wherein the first transistor is turned on and the first inductance element is grounded in a high-frequency manner when high-band television signals are received.

2. The television tuner according to claim 1, wherein the low-band receiving unit is provided with a low-band amplifier for amplifying the low-band television signals, the high-band receiving unit is provided with a high-band amplifier for amplifying the high-band television signals, and operations of the low-band amplifier and the high-band amplifier are switched by the first transistor, respectively.

3. The television tuner according to claim 2, wherein a second transistor in which an emitter is grounded and a collector is pulled up to the power supply through the first resistor is provided, a second resistor is connected between a base of the second transistor and an input terminal of the low-band amplifier, a collector of the second transistor is connected to an input terminal of the high-band amplifier, and the input terminal of the high-band amplifier is grounded through a third resistor, and the other end of the second inductance element is connected to the input terminal of the low-band amplifier through a fourth resistor interposed therebetween.

* * * * *